United States Patent
Natanzon

(10) Patent No.: US 8,959,054 B1
(45) Date of Patent: Feb. 17, 2015

(54) METHODS AND APPARATUS FOR OPTIMAL JOURNALING FOR CONTINUOUS DATA REPLICATION

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 257 days.

(21) Appl. No.: 12/731,945

(22) Filed: Mar. 25, 2010

(51) Int. Cl.
G06F 7/00 (2006.01)
G06F 17/00 (2006.01)
G06F 17/30 (2006.01)
G06F 11/14 (2006.01)

(52) U.S. Cl.
CPC ...... *G06F 17/30067* (2013.01); *G06F 11/1469* (2013.01)
USPC .......................................................... 707/649

(58) Field of Classification Search
CPC .......... G06F 2201/84; G06F 17/30067; G06F 11/1451; G06F 11/1435; G06F 11/1469
USPC ................................................. 707/649, 692
See application file for complete search history.

(56) References Cited

U.S. PATENT DOCUMENTS

| | | | | |
|---|---|---|---|---|
| 6,574,657 | B1 * | 6/2003 | Dickinson | 709/203 |
| 2003/0182330 | A1 * | 9/2003 | Manley et al. | 707/205 |
| 2004/0139128 | A1 * | 7/2004 | Becker et al. | 707/204 |
| 2004/0143639 | A1 * | 7/2004 | Rangan et al. | 709/212 |
| 2005/0193245 | A1 * | 9/2005 | Hayden et al. | 714/13 |
| 2005/0251540 | A1 * | 11/2005 | Sim-Tang | 707/202 |
| 2005/0262097 | A1 * | 11/2005 | Sim-Tang et al. | 707/10 |
| 2006/0013222 | A1 * | 1/2006 | Rangan et al. | 370/389 |
| 2006/0137010 | A1 * | 6/2006 | Kramer et al. | 726/22 |
| 2006/0224636 | A1 * | 10/2006 | Kathuria et al. | 707/200 |
| 2007/0055833 | A1 * | 3/2007 | Vu et al. | 711/162 |
| 2007/0214314 | A1 * | 9/2007 | Reuter | 711/114 |
| 2007/0266053 | A1 * | 11/2007 | Ahal et al. | 707/200 |
| 2008/0010322 | A1 * | 1/2008 | Lee et al. | 707/201 |
| 2008/0028009 | A1 * | 1/2008 | Ngo | 707/204 |
| 2008/0046479 | A1 * | 2/2008 | Pareek et al. | 707/202 |
| 2008/0082770 | A1 * | 4/2008 | Ahal et al. | 711/162 |
| 2008/0162590 | A1 * | 7/2008 | Kundu et al. | 707/202 |
| 2008/0229037 | A1 * | 9/2008 | Bunte et al. | 711/162 |
| 2009/0019459 | A1 * | 1/2009 | Rowan et al. | 719/328 |
| 2009/0119346 | A1 * | 5/2009 | Lu et al. | 707/201 |
| 2009/0240744 | A1 * | 9/2009 | Thomson et al. | 707/204 |
| 2010/0031274 | A1 * | 2/2010 | Sim-Tang | 719/318 |
| 2010/0179941 | A1 * | 7/2010 | Agrawal et al. | 707/624 |
| 2010/0241614 | A1 * | 9/2010 | Shaull et al. | 707/649 |
| 2010/0306174 | A1 * | 12/2010 | Otani | 707/640 |

\* cited by examiner

*Primary Examiner* — Ajay Bhatia
*Assistant Examiner* — Jessica N Le
(74) *Attorney, Agent, or Firm* — Krishnendu Gupta; Joseph D'Angelo

(57) ABSTRACT

A method, system, and program product for continuous data replication, comprising creating a snapshot of an image of a replication site at a first time, receiving a write transaction from a production site, applying the write transaction to the replicated image of the replication site, and adding the write transaction into a first journal data stream.

20 Claims, 16 Drawing Sheets

US 8,959,054 B1

METHODS AND APPARATUS FOR OPTIMAL JOURNALING FOR CONTINUOUS DATA REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for continuous data replication, comprising creating a snapshot of an image of a replication site at a first time, receiving a write transaction from a production site, applying the write transaction to the replicated image of the replication site, and adding the write transaction into a first journal data stream.

BRIEF DESCRIPTION OF THE DRAWINGS

The present invention will be more fully understood and appreciated from the following detailed description, taken in conjunction with the drawings in which.

DETAILED DESCRIPTION

Figure 1:
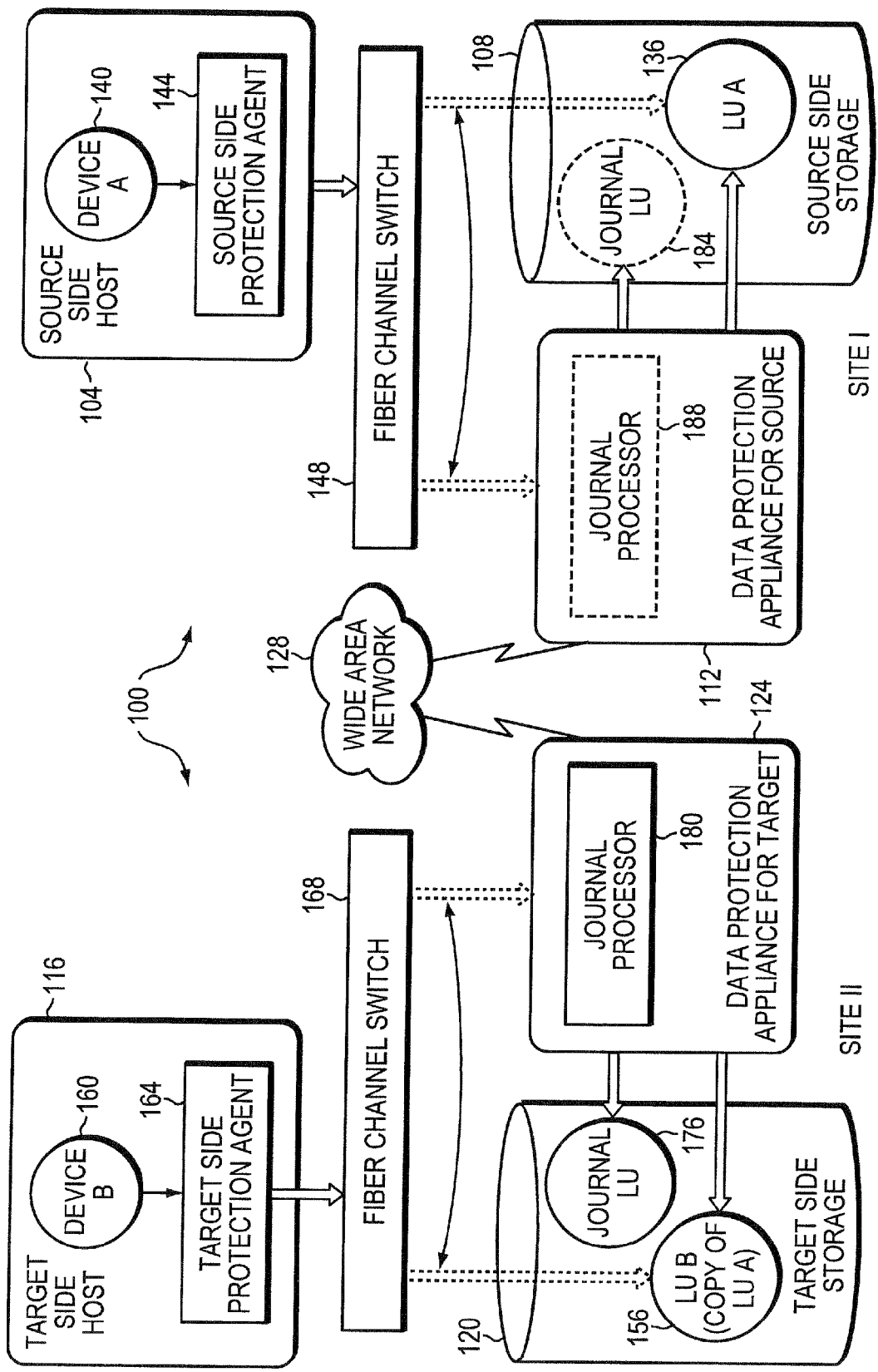
FIG. 1 is a simplified block diagram of a data protection system, in accordance with an embodiment of the present invention.

In an embodiment, the present invention concerns methods and systems for providing continuous data replication by integrating a data recovery appliance replication mechanism with a snapshot image or a clone image to achieve better performance. When data is being distributed to volumes, the main data recover appliance may typically use 5 phases of distribution. In an embodiment of the current invention, array clones or snapshots are used at the remote site of the replication. In some embodiments, all 5 phases may not be used.

In an embodiment, the replication may occur by taking a snapshot/clone at remote site, and applying replication changes to the user volume immediately as they occur. In an embodiment, the snapshot may be updated as to the differences between the copy and the last time snap and the changes may be denoted in the undo journal. In this embodiment, distribution may be enabled at a much quicker rate.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot list, which may represent different images over a time period. Snapshots may be taken by an array service which may be called an array based snapshot.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
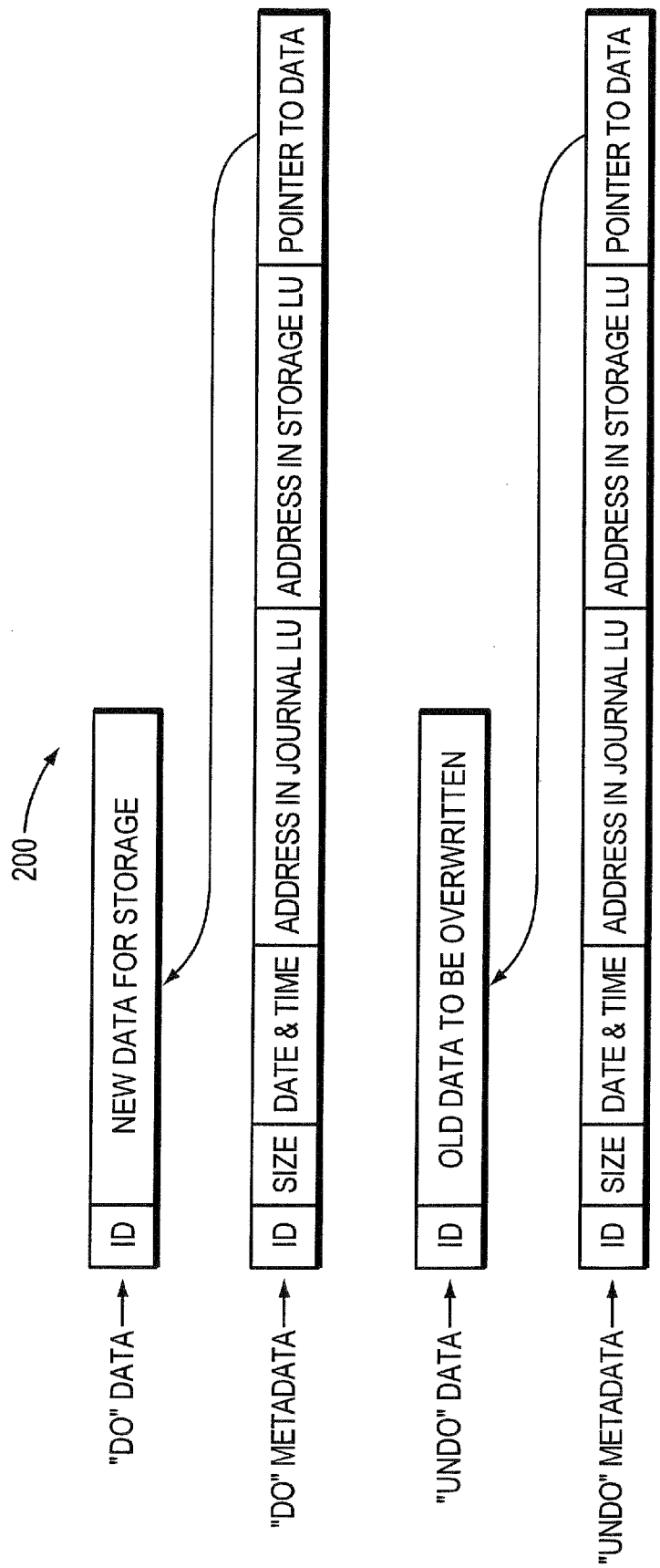
FIG. 2 is a simplified illustration of a journal history of write transactions for a storage system, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

Step 1  The new data is written at the end of the DO stream, assuming a forward write direction, and corresponding metadata is written at the end of the DO METADATA stream.
Step 2  Data is read from the beginning of the DO stream, and corresponding metadata is read from the beginning of the DO METADATA stream.
Step 3  Old data to be overwritten is read from LU B. The location and size of such old data is determined from the DO METADATA stream.
Step 4  The old data is written at the end of the UNDO stream, and corresponding metadata is written at the end of the UNDO METADATA stream.
Step 5  The new data read at Step 2 is written into LU B, and the beginning and end pointers of the DO and DO METADATA streams are moved appropriately.

Conversely, during a rollback to undo a write transaction, the above operations are reversed, as indicated in TABLE II below.

TABLE II

Undoing a write transaction in the journal

Step 1  Read the data and metadata from the end of the UNDO and UNDO METADATA streams.
Step 2  Read from LU B the data that is to be overwritten. The location and size of such data is determined from the UNDO METADATA stream.
Step 3  Write the data from Step 2 at the beginning of the DO stream, and update the DO METADATA stream accordingly.
Step 4  Write the data from Step 1 to LU B, and update the beginning and end pointers of the UNDO and UNDO metadata streams appropriately.

Figure 3:
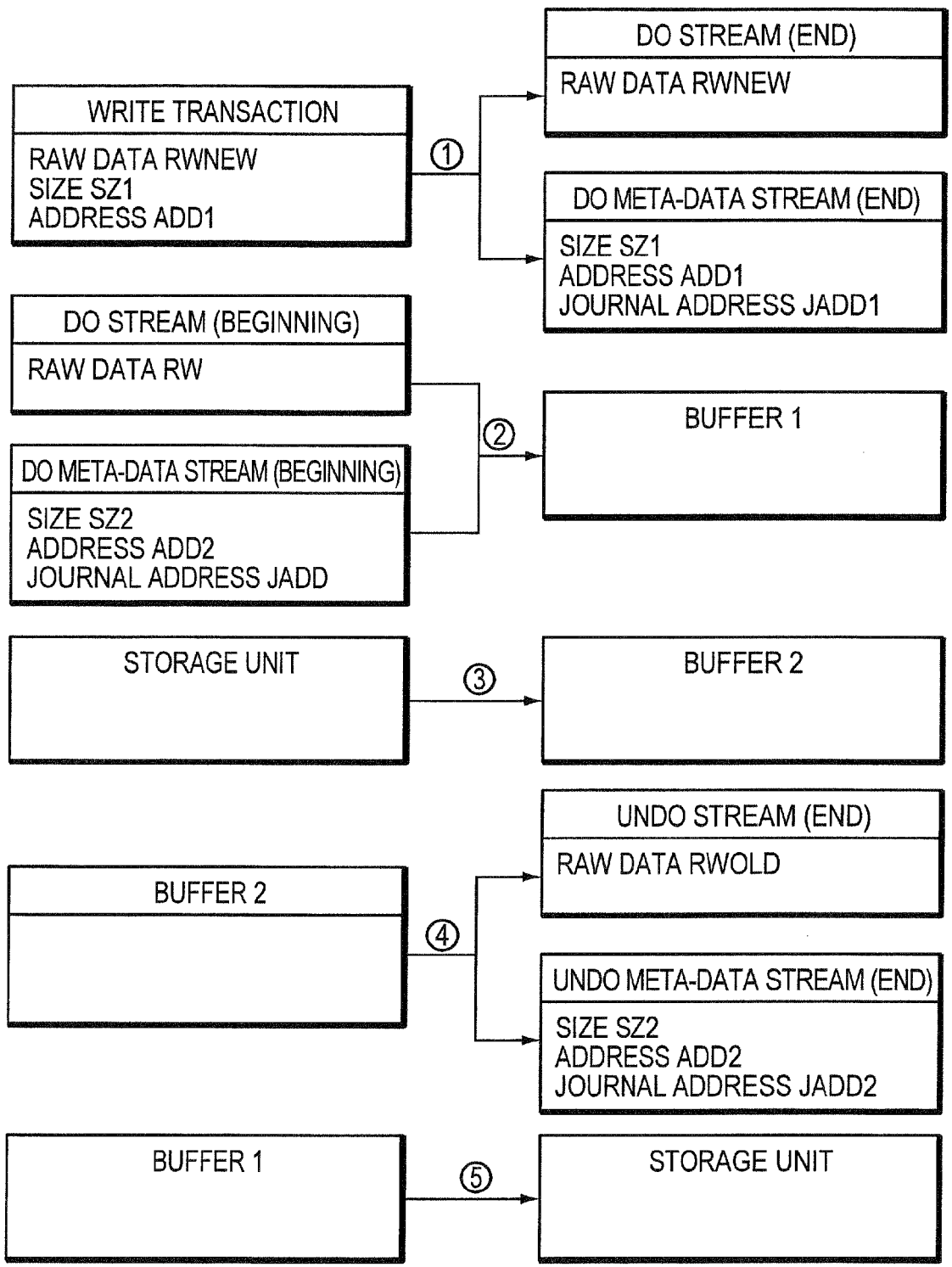
FIG. 3 is a simplified illustration of a five-stage journaling process for continuous data replication, in accordance with an embodiment of the present invention.

Referring back to TABLE I, it may be appreciated that during normal data replication, for each write transaction received from a production site, there are five I/O operations performed at a backup site. Reference is now made to FIG. 3, which is a simplified illustration of a 5-stage journaling process for continuous data replication, in accordance with an embodiment of the present invention. The five steps shown in FIG. 3 correspond respectively to the five steps listed in TABLE I. For the sake of clarity, FIG. 3 only shows three meta-data elements; namely, a size, a journal address and a storage address. It may be appreciated that the meta-data in the DO METADATA and UNDO METADATA streams includes an ID, a time, and other attributes.

Description of Embodiment Integrating Snapshots and Clone Images

In an embodiment, the present invention concerns methods and systems for providing continuous data replication by integrating a data recovery appliance replication mechanism with a list of snapshots or a clone image or images to achieve better performance and functionality. When data is being distributed to volumes, the main data recover appliance may typically use 5 phases of distribution, such as those phases described in Table I. In an embodiment of the current invention, array clones or an array snapshot or a list of snapshots are used at the remote site of the replication. In some embodiments, all 5 phases of the distribution may not be used.

In an embodiment, the replication may occur by taking a snapshot/clone at remote site. In certain embodiments, the snapshot/clone may be entered into a snapshot list. Replication changes may be applied to the user volume immediately as they occur. In an embodiment, multiple snapshots may be taken. For example, consider an embodiment where there is a snapshot at time X1 and it is desired to move the image to time X2. In this embodiment, there may also be a DO stream denoting the changes between X1 and X2. If it is desired to move the image from X1 to X2, the DO stream may be applied to move the image from time X1 to X2. In some embodiments, a copy of the image at time X1 may be used when applying the DO stream to create an image at time X2. In other embodiments, an UNDO stream may be created when the image is being moved from the image at time X1 to X2. With the UNDO stream, the image may be moved back from time X2 to time X1.

In an alternative embodiment, a snapshot may be taken of the current image. In this embodiment, the snapshot may be entered into a snapshot list. In certain embodiments, changes may be applied to the current image and the changes may be captured in a DO stream. In further embodiments, at a later point in time, another snapshot may be taken. In these embodiments, changes may continue to be applied to the current images and the changes may continue to be recorded in a DO stream. The snapshots, as they are taken, may be placed in a snapshot list. In certain embodiments, any point in time may be accessible using the snapshots and the DO stream with performance gains through the use of a snapshot.

Figure 4:
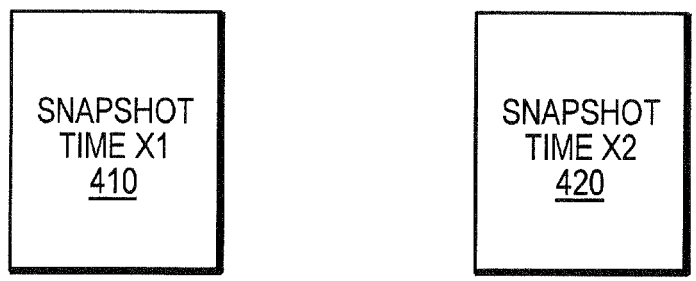
FIG. 4 is a an embodiment of a snapshot image at time X1 and a snapshot image at time X2.

As noted above, a snapshot may be a copy of an image, drive, images or drives at a given point of time. Snapshots may be taken at given points of time and multiple snapshots may form a list of snapshots. Referring to FIG. 4, each snapshot may refer to a copy of the data being replicated such as the data at point of time X1 410 and the data at point of time X2 420. An image may be rolled between times X1 and X2 by applying the differences in the images to arrive at a particular point of time.

Figure 5:
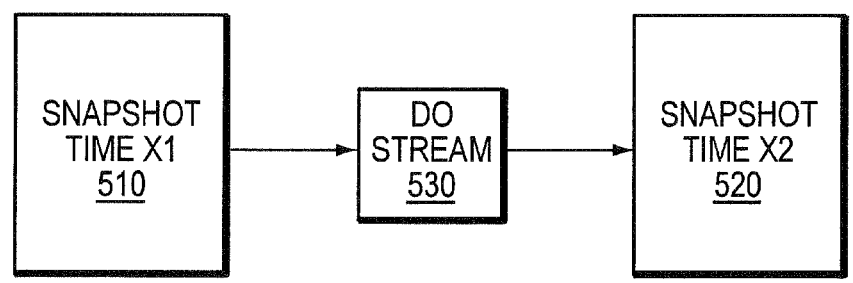
FIG. 5 is a an embodiment of DO stream data being applied to a snapshot at time X1 to reach a snapshot image at time X2.
Figure 6:
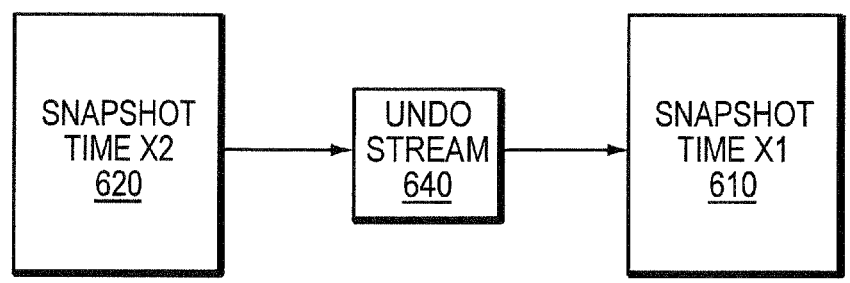
FIG. 6 is a an embodiment of UNDO stream data being applied to a snapshot at time X2 to reach a snapshot image at time X1.

Referring to FIG. 5, the DO 530 stream and DO META-DATA may be used to roll snapshots to particular points in time. As well, application of DO 530 data applied to a snapshot may be used to create an image at another point in time. Given a snapshot 510 at point in time X1, it may be possible to move the snapshot 510 at point in time X1 to point in time X2 by applying the data recorded in the DO 530 stream between time X1 and X2. Referring to FIG. 6, given an UNDO stream such as UNDO stream 640, the UNDO stream may also be applied to move Snapshot 620 back to Snapshot 610.

As well, it may be possible to reach any time between two snapshots by applying the DO or UNDO data. In some embodiments, it may be desired to reach a point X1+t, where X1+t<X2 and X1<X1+t. In this embodiment, it may be possible to take image X1 and apply the DO stream until X1+t is reached. As well, it may be possible to take X2, and apply the UNDO stream until X1+t is reached.

Figure 7:
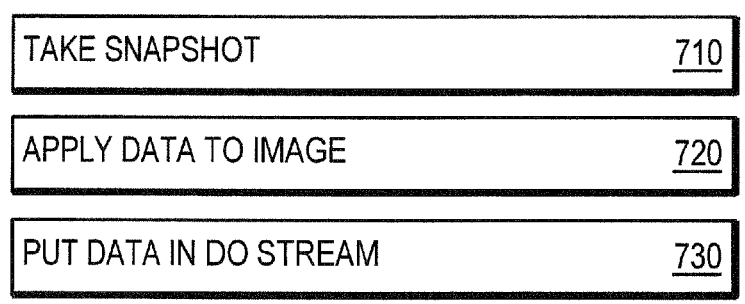
FIG. 7 is an embodiment of a method of the current invention.
Figure 8B:
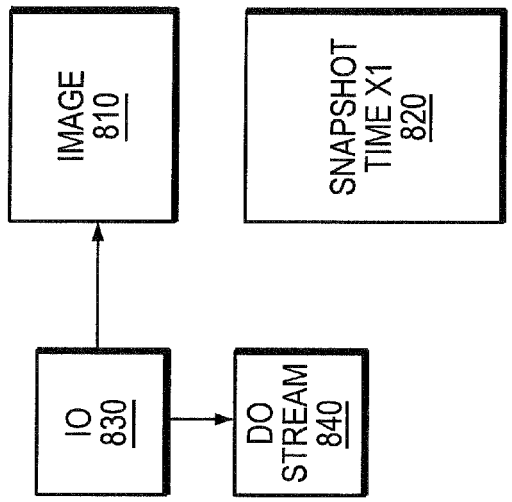
FIG. 8b is a simplified illustration of an image, DO stream data, IO, and a snapshot image at time X1.
Figure 8A:
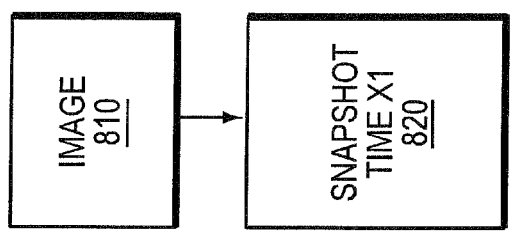
FIG. 8a is a simplified illustration of an image and a snapshot at time X1.

Referring to the embodiment of FIGS. 7, 8a, and 8B, a snapshot 820 may be taken 710 at the remote or replication site or image 810 for time X1. This snapshot 820 may represent the current state of the replicated data at time X1 when the snapshot is taken. As writes 830 occur at the production site and are sent to the replication site, these writes 830 may be directly applied 720 to the volume or image 810 at the replication site and may be written 730 to the DO stream 840.

TABLE III

Using a snapshot

| | |
|---|---|
| Step 1 | Take snapshot |
| Step 2 | Write data to DO stream and DO METADATA and Write data to replicated image |

Figure 9:
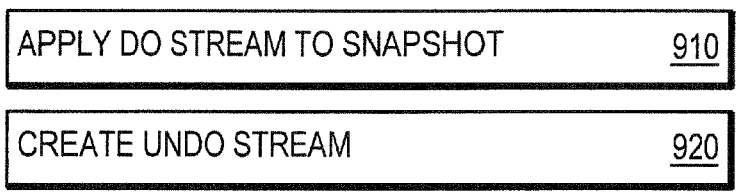
FIG. 9 is an embodiment of a method of the current invention.
Figure 10:
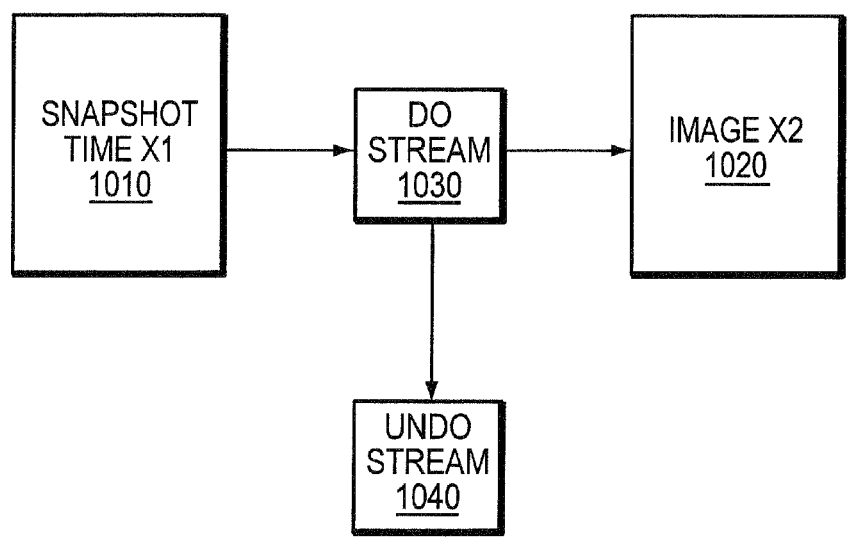
FIG. 10 is a simplified illustration of a snapshot image at time X1, DO stream data, UNDO stream data, and a snapshot image at time X2.

Referring to the embodiment of FIGS. 9 and 10, it may not be necessary to write to the UNDO stream when the data is being applied to the image. The snapshot 1010 and the DO stream 1030 allow data to be moved from a point in time forward to the image 1020 at time X2. As the DO stream 1030 is applied to the snapshot 1010, an UNDO stream 1040 may be created for the image 1020.

TABLE IV

Creating an UNDO Stream

| | |
|---|---|
| Step 1 | Apply DO data to snapshot |
| Step 2 | Create UNDO stream from data in the snapshot before applying the do data |

In an alternative embodiment, Data may be moved from the DO Stream to the UNDO Stream. As well, UNDO data may be read from the snapshot as the DO Stream is applied to the snapshot. Old data journal data may be kept. It may also be possible to create an UNDO stream from the application of the DO Stream to the snapshot, while moving the image from one point in time to another point in time. That is, the undo of the changes applied to an image at time X1 to move it to time X2 may be recorded in an UNDO stream.

Figure 11:
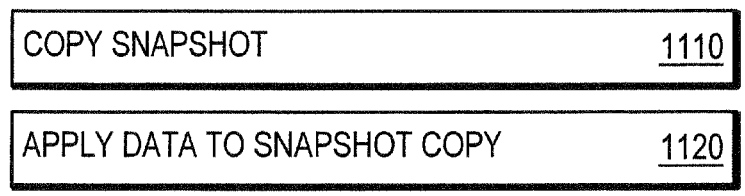
FIG. 11 is an embodiment of a method of the current invention.
Figure 12:
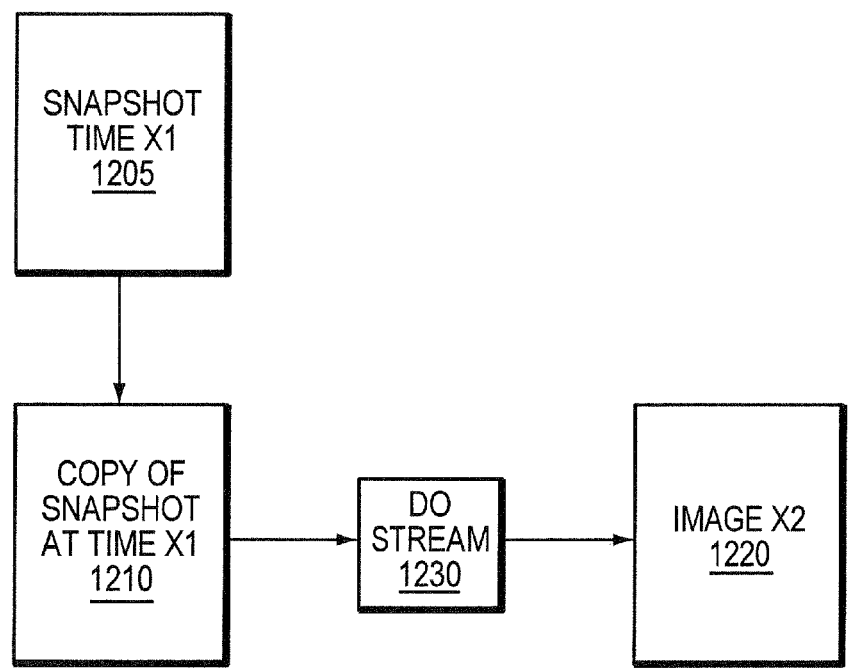
FIG. 12 is a simplified illustration of a snapshot image at time X1, a copy of a snapshot image at time X1, DO stream data, and a snapshot image at time X2.

Referring to the embodiments of FIGS. 11 and 12, a copy 1210 of the snapshot 1205 may be created 1110. The DO stream 1230 may be applied 1120 to the copy of the snapshot image 1210. In some embodiments, UNDO data may be created. In other embodiments, the UNDO stream may not be created. In other embodiments, the snapshot original snapshot image 1205 may be discarded, in other embodiments, the copy of the image may be discarded 1210.

With a convention using a 5 stage journal, the DO stream may grow to be extremely large. As well, depending on the size of the DO stream, the remote image may be very old. The replication site may fall behind in updating the image using the DO stream as it needs to process many incoming IOs. In an alternative embodiment, a snapshot may be taken by the storage array. Writes may be applied to the user image. Writes may also be recorded in the DO Stream. When the DO stream is applied to the snapshot, an UNDO stream of the changes may be created. In some embodiments, snapshots may be taken every hour. In other embodiments, snapshots may be taken according to user set preferences.

In an embodiment, the current invention applies data to the replicated image as it occurs and records the data in the DO stream. This may enable the replicated image to be very current. The DO stream, in conjunction with a snapshot, may enable an UNDO stream to be processed from the snapshot and the DO stream. The snapshot may represent an image at a point in time and the DO stream may enable the snapshot to be moved to the current image to create the UNDO stream.

In an embodiment, the snapshot may be placed in a snapshot list. The snapshot list may represent a copy of the image at different points in time. In some embodiments, if it were necessary to roll the image back to an earlier point of time, the snapshot may be used that is closest to the desired point in time. In this embodiment, the closest point of time may be after the desired time, and the closest point in time may be rolled back to the desired point in time by applying the UNDO stream. In other embodiments, the closest image before the point in time may be used. Base on the snapshot image selected, the DO stream may be used to roll this image forward to the earlier desired point in time. As well, a snapshot may be rolled forward in time.

Figure 13A:
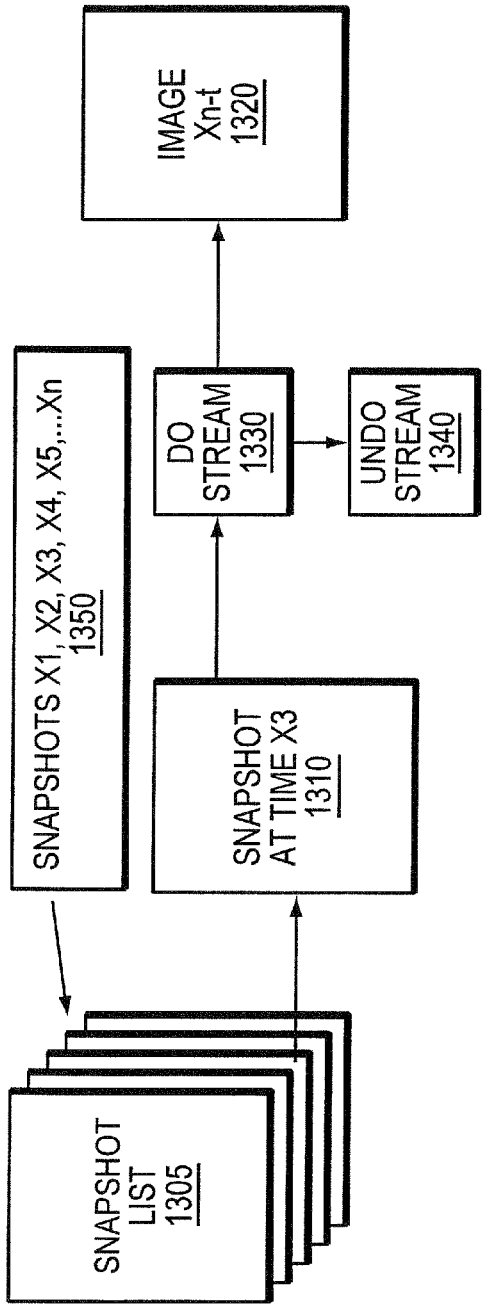
FIG. 13a is a simplified illustration of an embodiment of an application of DO stream data to an image to roll forward to a Point in Time.

In some embodiments, there may be a large DO stream and a list of array based snapshots. For example referring to FIG. 13a, assume there are n array snapshots 1305, X1, X2, X3, X4, X5 . . . , Xn 1350. Also assume that there is a DO stream 1330, denoting the changes from times X3 to Xn. In this embodiment, the user may access a the times X1, x2 and X3 and may apply to the DO stream to access any point in time between X3 and Xn. That is, the DO stream or the portion of the DO stream indicating the changes between X3 and Xn, may be applied to an image X3, X4 or X5 or any other image before Xn to bring it forward to any time between X3 and Xn. This may be done by applying entries in the DO stream that have a timestamp between X3 and Xn the desired time. In the embodiment of FIG. 13a, the DO stream 1330 is being applied to image X3 1330 to bring it forward to another point of time Xn-t 1320.

In a further embodiment, snapshots may be created every hour. In the case of a corrected image or disaster, it may be desired to move back in time a few minutes, a few seconds, or even a few hours. However, it may be desired to get to the desired Point in Time (PIT) very quickly. In some embodiments, if storage bandwidth did not allow keeping an undo stream at all times, and the latest image is corrupted, snapshots may be used to get to the appropriate PIT. In this embodiment, the snapshot closest to but before the PIT may be chosen and the DO data may be applied to reach the appropriate PIT. If UNDO data is available, then the closest PIT may be chosen and the snapshot may be rolled back or forth to find the latest point in time which is valid.

In further embodiments, the user may configure the system to store a set number of snapshots. For example, a user configuration may be to keep a monthly snapshot for the previous months, weekly snapshots for the last month, daily snapshots for the last week, and continuous protection for the last day. As continuous protection may be used for the last day, the system may not need to keep the DO stream beyond the last day. This may be because the DO stream corresponds to the changes to the image over a set period of time. In this example, it may be necessary to keep the DO stream for the last day. However, as the user has specified that it is desired to keep only snapshots for every day for the proceeding week, the DO stream may not need to be kept for this period. In an alternative example, it may be specified that it is requested to keep continuous protection for the last week. Then, the DO stream may need to be kept for the last week.

Figure 13B:
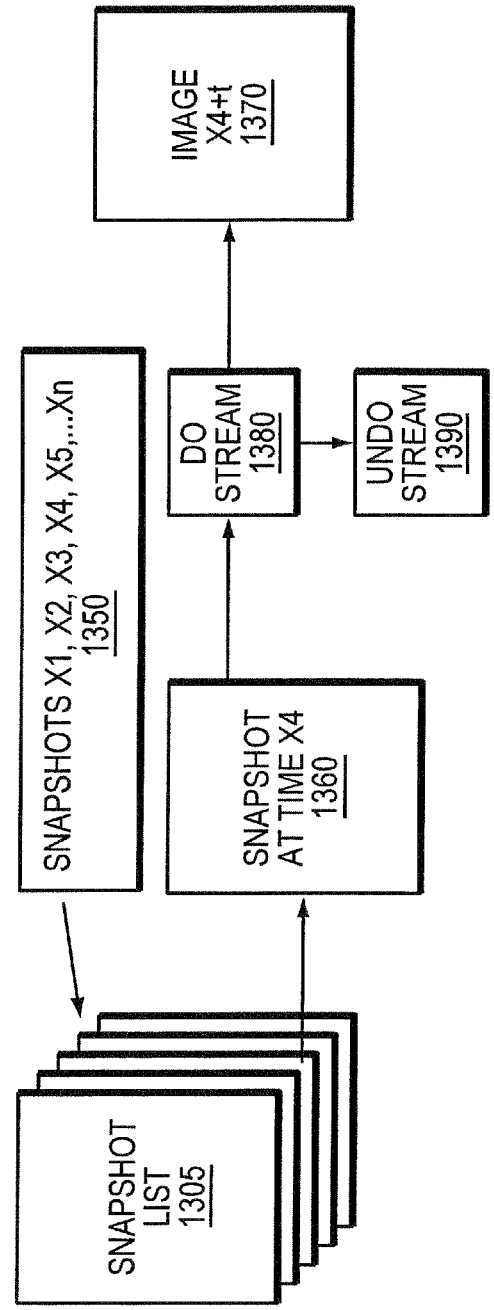
FIG. 13b is a simplified illustration of an alternative embodiment of an application of DO stream data to an image to roll forward to a Point in Time.

Refer to the embodiment of FIG. 13b. It may be desired to access a snapshot in between two snapshots at times X3 and XN, say a point in time between X4 and X5. To access this point in time, the DO stream 1380 may be applied to image X4 1360 and an UNDO stream 1390 may be created to move the image back to time X4 1360.

Figure 14:
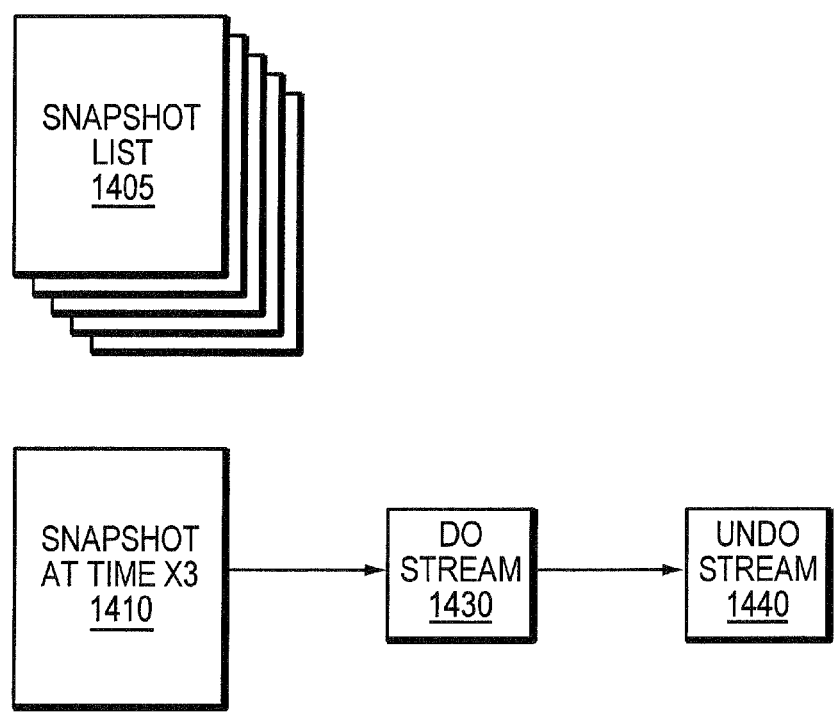
FIG. 14 is a simplified illustration of an embodiment of an application of DO stream data to create UNDO stream data.
Figure 15:
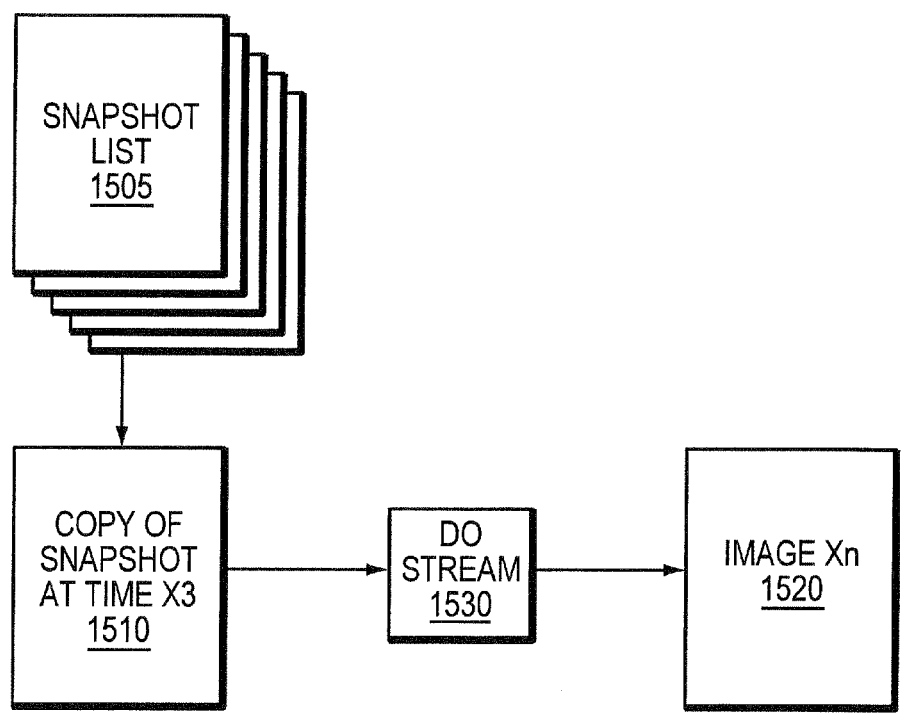
FIG. 15 is a simplified illustration of an embodiment of an application of DO stream data to a copy of a snapshot image to roll forward to a Point in Time.

In an alternative embodiment, as shown in FIG. 14, UNDO data may be created from the DO data without rolling the image forward. In a further embodiment, such as that of FIG. 15, a copy of the image at X4 may be created and UNDO data need not be created.

If bandwidth allows, it may be preferable to simply roll a snapshot from one point in time to another, in order to minimize the amount of resources needed to keep and maintain snapshot images. In an embodiment, where the snapshot is rolled from one point in time to another, it may be beneficial to keep UNDO data in order to roll the image back to a different point in time.

In a further embodiment, there may be two images, a snapshot at time X1 and a image at time X2. The snapshot may have been taken a previous point in time and the image maybe the replicated image, which may be being updated. If it is desired to keep only one image, the image at time X1 may be rolled to the image at X2 by applying the undo data. In certain embodiments, UNDO data may be created while rolling the image forward or applying the DO data. When the images are identical, i.e. all the DO data has been applied, the snapshot originally at X1 may be discarded. A new snapshot may be taken and the process may be repeated. Discarding the snapshot at time X1 may save storage space. As well, the data in the DO and UNDO streams may compressed while snapshots are usually not kept compressed.

Assume there are snapshots X1 and X2, and a do stream from X1 to X2, an undo stream may be created from X2 to X1, directly from the do stream and the Snapshot X1 without updating the snapshot X1; the algorithm may work by processing the do meta data stream in order to create a list of the changes to the volume, every time an undo entry is created, it may either be taken directly from image X1 or from the do stream (for instance, if block n was written 3 times, the first undo entry may be the value of n at image x1, the second entry may be the first value of n at the do stream, then the third entry may be the second value of n in the do stream.

Figure 16:
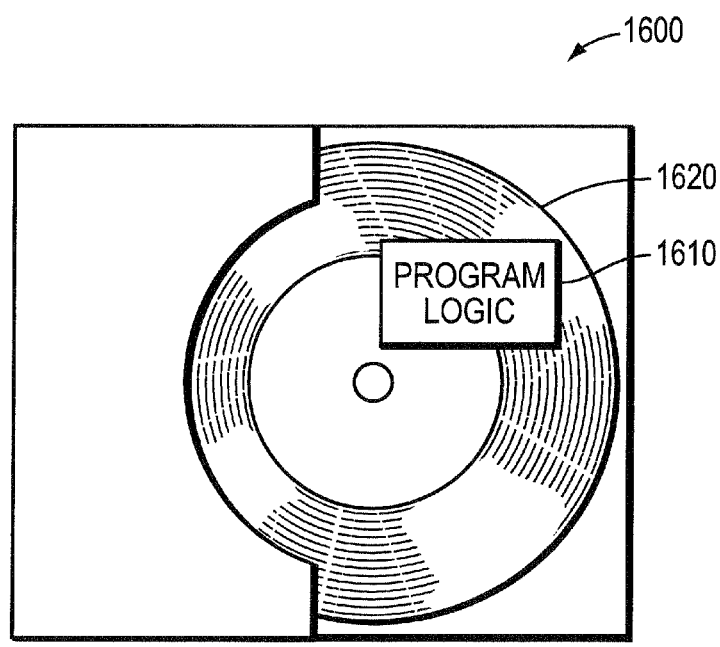
FIG. 16 is an embodiment of the current invention in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 16 shows Program Logic 1610 embodied on a computer-readable medium 1630 as shown, and wherein the Logic is encoded in computer-executable code configured for carrying out the reservation service process of this invention and thereby forming a Computer Program Product 1600.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer implemented method for continuous data replication, comprising:

creating a replication snapshot of a replication image at a replication site at a first time, wherein both the replication snapshot and the replication image are at the replication site, wherein the replication image of the replication site is enabled to replicate a production image at a production site;

receiving a write transaction from the production site to be replicated on the replication site;

applying the write transaction from the production site to the replication image of the replication site to replicate at the replication site one or more changes to the production image; and adding the write transaction into a first journal data stream at the replication site, wherein the first journal data stream is associated with the replication snapshot of the replication image of the replication site and enables the replication snapshot of the replication image to be rolled to a point in time up to and including the replication image by applying the write transactions in the first journal data stream to the snapshot of the replication image.

2. The method of claim 1 further comprising:
applying the first journal data stream to the replication snapshot of the replication image; and
capturing changes to the replication snapshot of the replication image from the application of the first journal data stream in a second journal data stream, wherein the second journal data stream enables the replication snapshot of the replication image to be rolled back in time by applying the changes captured in the second journal data stream.

3. The method of claim 1, wherein a number of and frequency of replication snapshots of the replication image kept in the replication snapshot array is designated by a user configurable user policy.

4. The method of claim 1 further comprising:
selecting a Point in Time;
selecting a replication snapshot of the replication image from the snapshot array closest to but before the Point in Time; and
applying the first journal data stream to the replication snapshot of the replication image to move the replication snapshot of the replication image to the Point in Time.

5. The method of claim 4, wherein the applying of the first journal stream to the replication snapshot of the replication image to move the replication snapshot of the replication image to the Point in Time comprises:
capturing changes from applying the first journal data stream to the replication snapshot of the replication image in a second journal data stream.

6. The method of claim 4, wherein the selecting of the replication snapshot of the replication image from the snapshot array closest to but before the Point in Time further comprises:
creating a copy of the replication snapshot of the replication image before applying the first journal data stream.

7. The method of claim 1 further comprising:
inserting the replication snapshot of the replication image into a snapshot array, wherein the first journal data stream enables each replication snapshot of the replication snapshots to be rolled to the replication image of the replication site by applying the write transactions in the first journal data stream to the each respective replication snapshot.

8. The method of claim 1 further comprising:
selecting a Point in Time (PIT);
selecting a snapshot from the replication snapshot array having a closest time after the Point in Time; and
applying the second journal data stream to the selected replication snapshot to move the selected replication snapshot to the Point in Time.

9. A system for continuous data replication, the system comprising:
a replication site;
a production site;
a first journal data stream; and
computer-executable program code configured for execution, on one or more processors, of the following steps:
creating a replication snapshot of a replication image at the replication site at a first time, wherein both the replication snapshot and the replication image are at the replication site, wherein the replication image of the replication site is enabled to replicate a production image at the production site;
receiving a write transaction from the production site to be replicated on the replication site;
applying the write transaction from the production site to the replication image of the replication site to replicate at the replication site one or more changes to the production image; and
adding the write transaction into the first journal data stream at the replication site, wherein the first journal data stream is associated with the replication snapshot of the replication image of the replication site and enables the replication snapshot of the replication image to be rolled to a point in time up to and including the replication image by applying the write transactions in the first journal data stream to the snapshot of the replication image.

10. The system of claim 9, wherein the computer-executable program code is further configured for execution of the following steps:
applying the first journal data stream to the replication snapshot of the replication image; and
capturing changes to the replication snapshot of the replication image from the application of the first journal data stream in a second journal data stream, wherein the second journal data stream enables the replication snapshot of the replication image to be rolled back in time by applying the changes captured in the second journal data stream.

11. The system of claim 9, wherein the computer-executable program code is further configured for execution of the following steps:
inserting the snapshot of the image into a snapshot array, wherein the first journal data stream enables each snapshot of the snapshots to be rolled to the replication image of the replication site by applying the write transactions in the first journal data stream to the each respective snapshot.

12. The system of claim 11, wherein a number of and frequency of replication snapshots of the replication image kept in the snapshot array is designated by a user configurable user policy.

13. The system of claim 11, wherein the computer-executable program code is further configured for execution of the following steps:
selecting a Point in Time;
selecting a replication snapshot of the replication image from the replication snapshot array closest to but before the Point in Time; and
applying the first journal data stream to the replication snapshot of the replication image to move the replication snapshot of the replication image to the Point in Time.

14. The system of claim 11, wherein applying the first journal stream to the replication snapshot image to move the replication snapshot image to the Point in Time further comprises:
capturing changes from applying the first journal data stream to the replication snapshot of the replication image in a second journal data stream.

15. A computer program product for continuous data replication in a data replication system, the data replication system comprising a first journal data stream, a production site, and a replication site, the computer program product comprising:

a non-transitory computer-readable storage medium encoded with computer-executable program code enabling one or more processors to execute:

creating a replication snapshot of a replication image at the replication site at a first time, wherein both the replication snapshot and the replication image are at the replication site, wherein the replication image of the replication site is enabled to replicate a production image at the production site;

receiving a write transaction from the production site to be replicated on the replication site;

applying the write transaction from the production site to the replication image of the replication site to replicate at the replication site one or more changes to the production image; and adding the write transaction into the first journal data stream at the replication site, wherein the first journal data stream is associated with the replication snapshot of the replication image of the replication site and enables the replication snapshot of the replication image to be rolled to a point in time up to and including the replication image by applying the write transactions in the first journal data stream to the snapshot of the replication image.

16. The computer program product of claim 15, wherein the computer-executable program code further enables:

applying the first journal data stream to the replication snapshot of the replication image; and capturing changes to the replication snapshot image from the application of the first journal data stream in a second journal data stream, wherein the second journal data stream enables the replication snapshot of the replication image to be rolled back in time by applying the changes captured in the second journal data stream.

17. The computer program product of claim 15, wherein the computer-executable program code further enables:

inserting the replication snapshot of the replication image into a snapshot array, wherein the first journal data stream enables replication snapshots to be rolled to the replication image of the replication site by applying the transactions in the first journal data stream to a respective replication snapshot.

18. The computer program product of claim 15, wherein a number of and frequency of replication snapshots of the replication image kept in the snapshot array is designated by a user configurable user policy.

19. The computer program product of claim 15, wherein the computer-executable program code further enables:

selecting a Point in Time;

selecting a replication snapshot of the replication image from the snapshot array closest to but before the Point in Time;

applying the first journal data stream to the replication snapshot of the replication image to move the replication snapshot of the replication image to the Point in Time; and capturing changes from applying the first journal data stream to the replication snapshot of the replication image in a second journal data stream.

20. The computer program product of claim 15, wherein the selecting of the replication snapshot of the replication image from the snapshot array closest to but before the Point in Time further comprises:

creating a copy of the replication snapshot of the replication image before applying the first journal data stream.

* * * * *